Jan. 22, 1963  A. COX ET AL  3,074,316
HIGHLY CORRECTED OPTICAL OBJECTIVE
Filed March 20, 1959
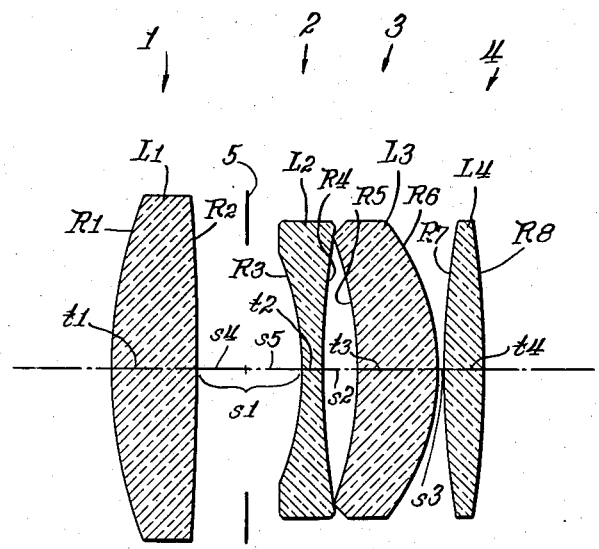
INVENTORS.
Arthur Cox
Irving C. Sandback
BY Robert F. Miehle, Atty.

United States Patent Office 3,074,316
Patented Jan. 22, 1963

3,074,316
HIGHLY CORRECTED OPTICAL OBJECTIVE
Arthur Cox, Park Ridge, and Irving C. Sandback, Morton Grove, Ill., assignors to Bell & Howell Company, Chicago, Ill., a corporation of Illinois
Filed Mar. 20, 1959, Ser. No. 800,675
2 Claims. (Cl. 88—57)

This invention relates to a highly corrected optical objective, and more particularly to an objective of the modified triplet type having a very low Petzval sum.

An object of the invention is to provide an optical objective having four components and a high degree of correction for all the aberrations.

Another object of the invention is to provide an objective having four components of which the front component is a positive singlet predominantly convex to the front followed by a stop, a biconcave component, a positive meniscus component and a biconvex component.

It is to be understood that the terms "front" and "rear" as herein used refer to the ends of the objective respectively nearer the longer and shorter conjugates thereof.

In the accompanying drawing, the single FIGURE illustrates an objective embodying the invention, and the invention provides an objective having, proceeding from front to rear, a front singlet predominantly convex forwardly, a stop, a biconcave singlet, a positive meniscus third component concave forwardly and a biconvex rear component. The third and rear components may be singlets or compounded, and in one disclosed embodiment the objective is corrected for finit conjugates while, in another disclosed embodiment, the objective is corrected with the longer conjugate infinite.

Referring now in detail to the drawing, there is shown therein a front biconvex component 1 composed of lens $L_1$ having a front surface of a radius $R_1$ much stronger than its rear surface of a radius $R_2$, which is adjacent a stop 5 and is spaced from a negative second component 2 an axial distance $s_1$. The stop is spaced midway between the components 1 and 2 equal axial distances $s_4$ and $s_5$. The component 2 is composed of a biconcave singlet $L_2$ predominantly concave toward the stop with its front and rear surfaces having radii of curvature $R_3$ and $R_4$ and spaced from positive third meniscus component 3 an axial distance $s_2$. The component 3 is shown as a singlet lens $L_3$ concave forwardly but may be compounded if desired. A rear component 4 spaced axially distance $s_3$ from the component 3 is biconvex and while shown as a singlet lens $L_4$ may be an achromatic doublet. The front surface of the component 4 has a radius of curvature $R_7$ substantially shorter than the radius of curvature $R_8$ of its rear surface. The components have respective axial thicknesses $t_1$ to $t_4$.

For a high overall correction of the aberrations, the objective should comply with the following inequalities where F is the equivalent focal length of the objective and $f_1$ to $f_4$ are the respective focal lengths of the components 1 to 4:

$$.55F < f_1 < 1.0F$$
$$.35F < -f_2 < .55F$$
$$.85F < f_3 < 1.25F$$
$$.9F < f_4 < 1.5F$$

To balance out higher order coma and astigmatism, the components 1 and 2 should comply with the following inequalities:

$$0 < \left|\frac{R_1}{R_2}\right| < .45$$

$$.25 \wedge \left|\frac{R_3}{R_4}\right| < .45$$

and, to remove higher order spherical aberrations the components 3 and 4 should comply with the following inequalities:

$$.50 < \left|\frac{R_6}{R_5}\right| < .70$$

$$.20 < \left|\frac{R_7}{R_8}\right| < .80$$

A preferred example of the objective balanced for finite conjugates at 15× is constructed in conformity with the following table wherein dimensions are in terms of inches and the refractive indices for the sodium D line and the Abbe dispersion numbers are respectively designated at $n_d$ and V:

[Equivalent focal length, F=1.000. Back focal length, B.F.=.8838. Relative aperture f/2.5]

| | | | | |
|---|---|---|---|---|
| $L_1$ | $R_1 = .855$ | $t_1 = .227$ | $n_d = 1.734$ | V=51.2 |
| | $R_2 = -2.402$ | $s_1 = .125$ | | |
| $L_2$ | $R_3 = -.427$ | $t_2 = .030$ | $n_d = 1.720$ | V=29.3 |
| | $R_4 = +1.330$ | $s_2 = .050$ | | |
| $L_3$ | $R_5 = -.606$ | $t_3 = .110$ | $n_d = 1.697$ | V=56.2 |
| | $R_6 = -.376$ | $s_3 = .005$ | | |
| $L_4$ | $R_7 = +1.114$ | $t_4 = .060$ | $n_d = 1.697$ | V=56.2 |
| | $R_8 = -3.715$ | | | |

A preferred example of the objective focused for infinity is constructed in substantial compliance with the following table in which dimensions are in terms of inches and the refractive indices for the sodium D line and the Abbe dispersion numbers are respectively designated at $n_d$ and V:

[Equivalent focal length, F=1.000. Back focal length, B.F.=.867. Relative aperture f/2.5]

| | | | | |
|---|---|---|---|---|
| $L_1$ | $R_1 = +.7092$ | $t_1 = .120$ | $n_d = 1.6934$ | V=53.5 |
| | $R_2 = -4.673$ | $s_1 = .155$ | | |
| $L_2$ | $R_3 = -.4305$ | $t_2 = .030$ | $n_d = 1.689$ | V=30.9 |
| | $R_4 = +1.1023$ | $s_2 = .050$ | | |
| $L_3$ | $R_5 = -.5721$ | $t_3 = .120$ | $n_d = 1.620$ | V=60.0 |
| | $R_6 = -.3448$ | $s_3 = .005$ | | |
| $L_4$ | $R_7 = +1.0811$ | $t_4 = .060$ | $n_d = 1.620$ | V=60.0 |
| | $R_8 = -1.7422$ | | | |

While the invention is thus described, it is not wished to be limited to the precise details described, as changes may be readily made without departing from the spirit of the invention.

What is claimed is:

1. In an optical objective, proceeding from front to rear, a biconvex singlet front component, a stop, a biconcave singlet component, a positive meniscus third component concave to the front, and a biconvex rear component, and being further characterized in that the objective conforms substantially to the following table in which dimensions are in terms of inches, and proceeding from front to rear $L_1$ to $L_4$ designate the lenses, $R_1$ to $R_8$ the radii of curvature of the surfaces, $t_1$ to $t_4$ the axial thicknesses, $s_1$ to $s_3$ the axial separations, $n_d$ the indices of refraction for the sodium D line and V the Abbe dispersion numbers:

[Equivalent focal length, F=1.000. Back focal length, B.F.=.8838. Relative aperture f/2.5]

|  |  |  |  |  |
|---|---|---|---|---|
| $L_1$ | $R_1=.855$<br>$R_2=-2.402$ | $t_1=.227$<br>$s_1=.125$ | $n_d=1.734$ | $V=51.2$ |
| $L_2$ | $R_3=-.427$<br>$R_4=+1.330$ | $t_2=.030$<br>$s_2=.050$ | $n_d=1.720$ | $V=29.3$ |
| $L_3$ | $R_5=-.606$<br>$R_6=-.376$ | $t_3=.110$<br>$s_3=.005$ | $n_d=1.697$ | $V=56.2$ |
| $L_4$ | $R_7=+1.114$<br>$R_8=-3.715$ | $t_4=.060$ | $n_d=1.697$ | $V=56.2$ |

2. In an optical objective, proceeding from front to rear, a biconvex singlet front component, a stop, a biconcave singlet second component, a positive meniscus third component concave to the front, and a biconvex rear component, and being further characterized in that the objective conforms substantially to the following table in which dimensions are in terms of inches, and proceeding from front to rear $L_1$ to $L_4$ designate the lenses, $R_1$ to $R_8$ the radii of curvature of the surfaces, $t_1$ to $t_4$ the axial thicknesses, $s_1$ to $s_3$ the axial separations, $n_d$ the indices of refraction for the sodium D line and V the Abbe dispersion numbers:

[Equivalent focal length, F=1.000. Back focal length, B.F.=.867. Relative aperture f/2.5]

|  |  |  |  |  |
|---|---|---|---|---|
| $L_1$ | $R_1=+.7092$<br>$R_2=-4.673$ | $t_1=.120$<br>$s_1=.155$ | $n_d=1.6934$ | $V=53.5$ |
| $L_2$ | $R_3=-.4305$<br>$R_4=+1.1023$ | $t_2=.030$<br>$s_2=.050$ | $n_d=1.689$ | $V=30.9$ |
| $L_3$ | $R_5=-.5721$<br>$R_6=-.3448$ | $t_3=.120$<br>$s_3=.005$ | $n_d=1.620$ | $V=60.0$ |
| $L_4$ | $R_7=+1.0811$<br>$R_8=-1.7422$ | $t_4=.060$ | $n_d=1.620$ | $V=60.0$ |

References Cited in the file of this patent

UNITED STATES PATENTS

| | | |
|---|---|---|
| 660,202 | Rudolph | Oct. 23, 1900 |
| 660,747 | Bausch | Oct. 30, 1900 |
| 1,540,752 | Bielicke | June 9, 1925 |
| 1,580,751 | Merte | Apr. 13, 1926 |
| 1,877,355 | Minor | Sept. 13, 1932 |
| 1,888,156 | Bielicke | Nov. 15, 1932 |
| 2,170,428 | Richter | Aug. 22, 1939 |
| 2,171,640 | Berek | Sept. 5, 1939 |
| 2,260,368 | Durand | Oct. 28, 1941 |
| 2,432,387 | Creighton | Dec. 9, 1947 |
| 2,536,508 | Lotmar | Jan. 2, 1951 |
| 2,767,614 | Altman | Oct. 23, 1956 |
| 2,777,363 | Wanke et al. | Jan. 15, 1957 |

FOREIGN PATENTS

| | | |
|---|---|---|
| 299,983 | Great Britain | Nov. 8, 1928 |
| 430,186 | Italy | Feb. 12, 1948 |